(12) United States Patent  
Tombroff et al.

(10) Patent No.: US 9,294,559 B2  
(45) Date of Patent: Mar. 22, 2016

(54) FAULT-TOLERANCE MECHANISM OPTIMIZED FOR PEER-TO-PEER NETWORK

(75) Inventors: Dimitri Tombroff, Nozay (FR); Pierre De Rop, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1548 days.

(21) Appl. No.: 12/457,413

(22) Filed: Jun. 10, 2009

(65) Prior Publication Data

US 2009/0313375 A1    Dec. 17, 2009

(30) Foreign Application Priority Data

Jun. 11, 2008    (FR) ...................................... 08 53867

(51) Int. Cl.
*G06F 15/16* (2006.01)
*H04L 29/08* (2006.01)
*H04L 12/24* (2006.01)
*H04L 29/14* (2006.01)

(52) U.S. Cl.
CPC .......... *H04L 67/104* (2013.01); *H04L 41/0893* (2013.01); *H04L 67/1046* (2013.01); *H04L 69/40* (2013.01)

(58) Field of Classification Search
USPC ........................................................ 709/226
See application file for complete search history.

(56) References Cited

U.S. PATENT DOCUMENTS

| | | | | |
|---|---|---|---|---|
| 2003/0204509 | A1* | 10/2003 | Dinker et al. | 707/100 |
| 2003/0204786 | A1* | 10/2003 | Dinker et al. | 714/43 |
| 2004/0059805 | A1* | 3/2004 | Dinker et al. | 709/223 |
| 2004/0066741 | A1* | 4/2004 | Dinker et al. | 370/216 |
| 2004/0254984 | A1* | 12/2004 | Dinker | 709/205 |
| 2007/0230482 | A1* | 10/2007 | Shim et al. | 370/400 |
| 2009/0316687 | A1* | 12/2009 | Kruppa | 370/352 |

FOREIGN PATENT DOCUMENTS

EP    1 553 747    1/2005

OTHER PUBLICATIONS

Ion Stoica et al., "Chord: A Scalable Peer-to-peer Lookup Service for Internet Applications" Proceedings of ACM Sigcomm, Aug. 27, 2001, whole document.

* cited by examiner

*Primary Examiner* — Natisha Cox

(74) *Attorney, Agent, or Firm* — Harness, Dickey & Pierce, P.L.C.

(57) ABSTRACT

Communication element ($E_2$) comprising at least one interface with a communication network ($N_{TEL}$) containing other communication elements ($E_1$), and a peer-to-peer network ($N_{p2p}$) for processing requests (Req) from the other communication elements, consisting of nodes ($N_1$, $N_2$, $N_3$, $N_4$, $N_5$) distributed among a set of processing devices and arranged in a circle. It is associated with a management device comprising admission means to insert a new node within the peer-to-peer network. The communication element is intended so that contextual information used for processing said requests can be stored in the nodes and is characterized in that the admission means are intended to determine a pair of adjacent nodes deployed on a same processing device and to insert the new node between the two nodes of the pair.

9 Claims, 2 Drawing Sheets

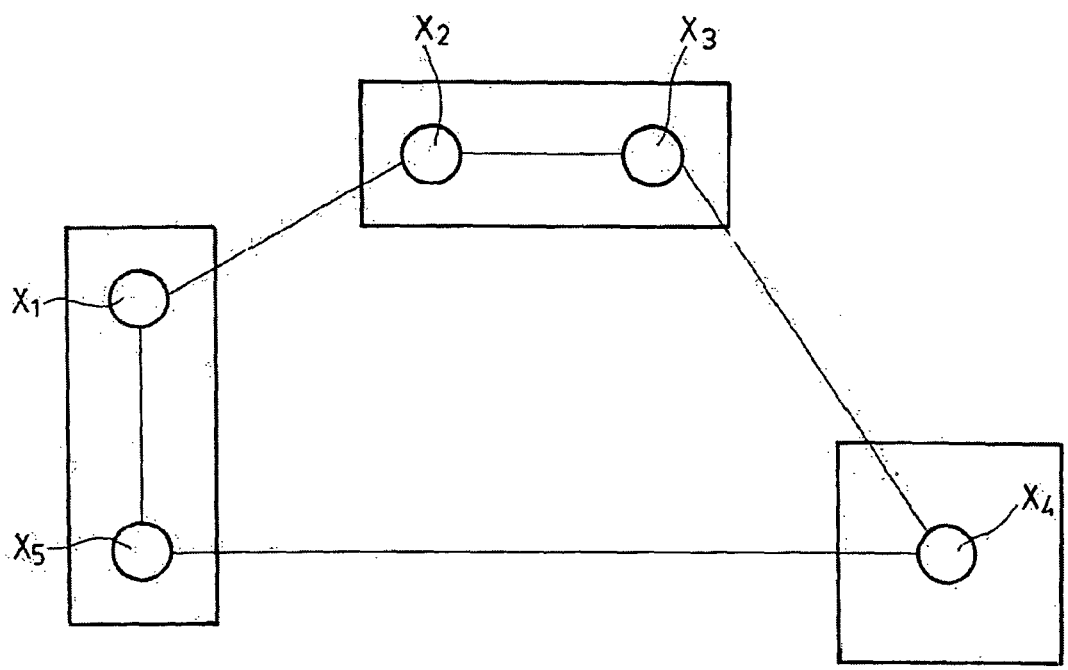
FIG_1
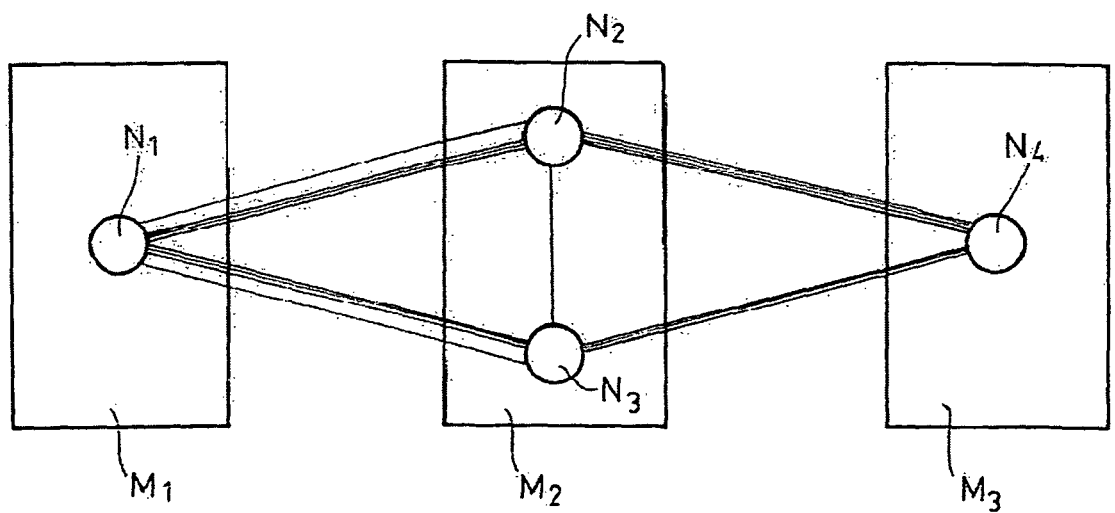
FIG_2

FIG_3a
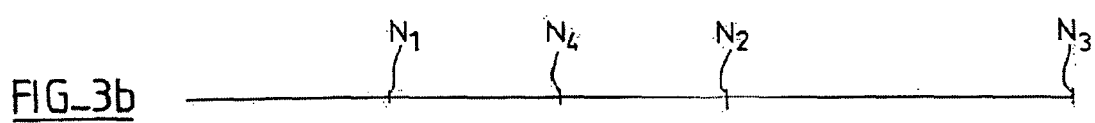
FIG_3b
FIG_4
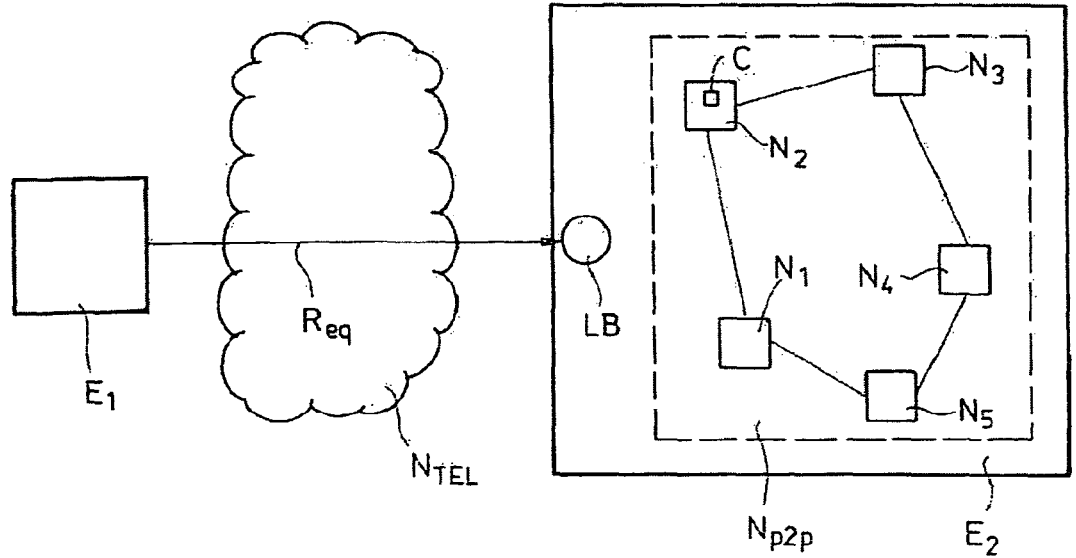

FAULT-TOLERANCE MECHANISM OPTIMIZED FOR PEER-TO-PEER NETWORK

The present invention relates to the deployment of a peer-to-peer network on a set of processing devices. It concerns more specifically the use of these peer-to-peer networks for telecommunication applications.

It is known to distribute certain telecommunication applications, in particular on a set of processing nodes. In this way, each node only processes a part of the requests addressed to the application and it is possible to dimension, dynamically if necessary, the number of nodes based on the resources required to process these requests. Such an architecture also means the application can easily be made fault-tolerant through the inherent redundancy between the nodes.

For certain applications, however, the problem still exists of the location of contextual information within this set of nodes. Certain applications such as a signaling element may require the storage of a context between two messages which it is sent. This context may be used to process a following message appropriately. This is the case for a SIP or "proxy SIP" signaling element which must process a request based on the status of the SIP session (SIP standing for "Session Initiation Protocol").

For this type of application, it is also necessary firstly to store this contextual information and secondly to be able to locate said information at the appropriate moment.

One possible approach involves having a centralized database to which each of the nodes has access and can store and retrieve contextual information for the sessions it manages.

However, when this centralized database is implemented on a hard disk or an equivalent hardware support, the information access time becomes restrictive and makes this solution unsuitable for applications requiring very short response times such as telecommunication applications.

Implementing the database in the memory removes this access time problem, but the need to incorporate redundancy to distribute the load of the accesses and to meet the fault-tolerance constraints makes the system complex. It in fact involves constituting a network of bases separate from the set of processing nodes. Aside from the fact that such an approach does not seem very satisfactory on an intellectual level, it also causes configuration problems and is neither flexible nor easy to manage.

Peer-to-peer networks, through the use of a distributed hash table, are used to resolve these problems in an automatic and transparent manner for the developer of the application and for the devices external to the application and which have to communicate with said application.

FIG. 1 shows in diagram form a peer-to-peer network comprising N nodes X1, X2, X3, X4 . . . XN.

The contextual information to be stored is associated with keys which are distributed over this set of nodes. In general, this distribution is carried out by a hashing function which is used to project the space of the keys to the space of the nodes while obtaining a good load distribution among these nodes.

The contextual information can be found from the key. The application of the same hashing function is used to determine the node associated with this key, then to retrieve the information stored on this node and associated with the key.

In order to make the system fault-tolerant, it is generally intended for each association between a key and contextual information to be replicated on a second node. In this way, if the first node no longer works, the contextual information can be retrieved from this second node.

A simple algorithm commonly used to determine which node must store the copy of the contextual information involves selecting the successor, in other words the node following the order of the peer-to-peer network. The advantage of such a choice is that in the event of a failure of a node, the copy of the contextual information is immediately located. This thereby avoids a period of uncertainty following a failure, requiring an additional procedure to correctly manage this period without risking an incorrect response to a request.

Therefore, if the hash function applied to the required key designates the node X2 and this node is no longer accessible or no longer contains the information following a malfunction, the system automatically determines that a copy of the required contextual information is located in the node X3.

These implementations of a peer-to-peer network are explained in further detail in the article "*Chord: A Scalable Peer-to-peer Lookup Service for Internet Applications*" by Ian Stoica, Robert Morris, David Karger, M. Frans Kaashoek and Hari Balakrishnan, ACM SIGCOMM 2001, San Diego, Calif., August 2001, pp. 149-160.

However, in practice, the technical problem of fault-tolerance persists. Peer-to-peer networks are in practice deployed on processing device networks. Since these devices are increasingly powerful, it is advantageous to deploy several nodes on the same device. In the example of FIG. 1, the nodes X2 and X3 are located on device M2, nodes X1 and XN are located on device M1 and node X4 is located on device M3.

As a result, if a processing device suffers a malfunction, the nodes present may be affected and no longer work. Therefore, if the processing device M2 breaks down, the two nodes X2 and X3 no longer work.

Yet according to the traditional algorithm involving locating the copy of the information on the successor node, the information stored on node X2 is duplicated on node X3. As a result, despite the fault-tolerance mechanism of the state of the art, the contextual information associated with the node is no longer available.

The state of the art is therefore unsuitable for providing sufficient fault-tolerance. The aim of the present invention is to overcome this insufficiency by improving the management of a peer-to-peer network.

To do this, the first objective of the invention is to provide a peer-to-peer network management device comprising a set of nodes distributed among a set of processing devices and arranged in a circle so that each node has a unique successor node. The management device comprises admission means (or admission components) to insert a new node within the peer-to-peer network. It is characterized in that the admission means are also intended to determine an pair of adjacent nodes deployed on the same processing device and to insert this new node between the two nodes of the pair thus determined.

The admission means may for example be an admission component implemented by a different device to said nodes, or an admission component implemented by all or some of the nodes of the peer-to-peer network.

The invention also has the objective of providing a communication element comprising at least one interface with a communication network containing other communication elements, and a peer-to-peer network for processing requests from these other communication elements. The peer-to-peer network consists of nodes distributed among a set of processing devices and arranged in a circle so that each node has a unique successor node. This peer-to-peer network is also associated with a management device comprising admission means to insert a new node within the peer-to-peer network.

The communication element according to the invention is intended so that contextual information used for processing the requests is stored in the nodes, and is characterized in that the admission means are intended to determine a pair of adjacent nodes deployed on the same processing device and to insert the new node between the two nodes of the pair concerned.

The contextual information can be duplicated in the successor nodes.

The admission means may for example be an admission component implemented by a different device to said nodes, or an admission component implemented by all or some of the nodes of the network.

The interface with a communication network can be suitable for sending signaling messages compliant with the SIP protocol.

The invention will appear more clearly in the following description, with reference to the attached figures.

FIG. 1, previously commented upon, shows in diagram form a peer-to-peer network, compliant with the state of the art.

FIG. 2 shows in diagram form a peer-to-peer network deployed on a set of processing devices, in accordance with the invention.

FIGS. 3a and 3b illustrate the distribution of the information stored in the peer-to-peer network.

FIG. 4 illustrates a communication element according to the invention.

First of all the peer-to-peer network and the management device will be described, then their application within a communication element.

FIG. 2 shows a peer-to-peer network deployed on a network consisting of 3 processing devices M1, M2, M3. The peer-to-peer network consists of a set of nodes N1, N2, N3 and N4 arranged in a circle so that each node has a unique successor node (and a unique predecessor node).

Attached to this peer-to-peer network is a management device comprising admission means in particular. These admission means are responsible for the insertion of a new node within the peer-to-peer network. Upgradeability is an essential property of peer-to-peer networks, in the sense that nodes can be added or removed at any time and that the network must be designed to self-organize.

If we assume that the network is at a given time made up of nodes N1, N2, N3, the admission of the new node N4 involves the determination of the position of the incoming node within the already-constituted network, as well as the determination of a new distribution of the keys in the set of nodes. This distribution is used in particular to distribute the load by drawing from the contribution of the new nodes in terms of processing and storage resources.

FIGS. 3a and 3b illustrate more clearly the determination of a new distribution of the keys.

Each horizontal line represents the space of the keys. The nodes present in the network are placed on these lines. Each of these nodes is associated with a subset of keys, corresponding to the keys it stores.

FIG. 3a corresponds to a first situation in which the network is comprised of the nodes N1, N2 and N3. Each of the nodes stores a subset corresponding to a third of the total set of keys. This subset corresponds, on FIG. 3a, to the part of the horizontal line located to its left, as far as the previous node or the start of the line.

When the node N4 is to be added to the peer-to-peer network, the admission means determine the position it must take within the network and the distribution of the keys.

The location of node deployment on a processing device M1, M2, M3, M4 may be triggered by the admission means, but the determination of this location is traditionally the responsibility of other modules of the management system. For example, it may be intended for this location to be determined by the underlying operating system, without the admission means having the means to control it.

The admission means are an admission component which may be implemented by a different device to the nodes of the peer-to-peer network. It may also be implemented by all or some of these nodes. Therefore, a new incoming node can be addressed either to any node already a member of the network, or to some of these nodes playing a specific admission role.

According to the invention, the admission component is intended to determine a pair of adjacent nodes deployed on the same processing device. Two nodes are adjacent if one is the successor to the other within the peer-to-peer network. For example, in the case of a network formed of nodes, if we assume that the network at a given time consists of nodes N1, N2, N3, then nodes N1 and N2 are adjacent, nodes N2 and N3 are adjacent and nodes N1 and N3 are adjacent. Nodes N2 and N3 form the only pair of adjacent nodes deployed on the same processing device, M2.

The admission component is then intended to insert the new node N4 between the two nodes of this pair N2, N3.

The new peer-to-peer network forms a circle containing the nodes ordered N1, N2, N4 and N3. Therefore, the pair of adjacent nodes N2, N3 is broken and there are no more pairs of adjacent nodes deployed on the same processing device. More generally, the admission of a new node is used to reduce by one unit the number of these pairs.

If there were no pairs of this type, the admission composition may operate in accordance with the state of the art and for example insert the new node between the last node and the first node of the circle formed by the network.

FIG. 3b shows the node N4, added between the nodes N2 and N3. The peer-to-peer network configures itself such that the subset of keys previously associated with the node N3 is divided into two parts, the part furthest to the left being associated with the new node N4, and the part furthest to the right remaining associated with the node N3. These two parts are more or less an identical size.

The part of the keys newly associated with node N4 is transferred from the node N3 to this new node. Along with these keys, the information associated therewith is also transferred. This information may be contextual information in the case of an application with a communication element as will be described below.

To ensure the fault-tolerance of the peer-to-peer network, the (contextual) information is duplicated on the successor node. The successor node is the following node in the circular order of the network N1, N2, N4, N3.

Because of the way in which the new nodes are inserted in the peer-to-peer network, the successor of each node is not located on the same processing device as this node.

Therefore, the successor of node N2 is now node N4 which is deployed on the processing device M3.

If the processing device M2 suffers a malfunction, the node N4, located on the device M3, may provide the copy of the information from the node N2, and the node N1, located on the device M1, may provide the copy of the information from the node N3.

The problem posed by the nodes N2 and N3 in the state of the network prior to the admission of the node N4 is therefore resolved.

FIG. 4 shows the application of a peer-to-peer network according to the invention with a communication element. This may be an application server in a communication architecture, such as an IMS ("IP Multimedia Subsystem") architecture. It may also be a signaling element, such as a proxy compliant with the SIP protocol ("Session Invitation Protocol") as specified by RFC 3261 of the IETF, or a CSCF function ("Call Session Control Function") within an IMS architecture.

This communication element $E_2$ has means of receiving a request Req coming from another element $E_1$ through a communication network $N_{TEL}$. The request Req is processed by a load distribution module LB, intended to determine, for each first request of a communication session, which node N1, N2, N3, N4, N5 must process the request. These nodes form a peer-to-peer network $N_{p2p}$ as described previously.

The processing of the request may cause the generation of contextual information which may be useful or necessary for the processing of another request belonging to the same session. It is therefore associated with a key, and stored on the node corresponding to this key.

The association is made by a hash function applied to a session identifier (for example, IP addresses of the issuing communication element $E_1$, "call ID" header of the SIP request, etc.). The result of this hashing function may directly give the number of the node modulo the number of nodes in the network. These different mechanisms are known to the state of the art and are not described in detail in this patent request. The article mentioned previously and concerning the "Chord" mechanism may be consulted to obtain some of these details.

In the example of FIG. 4, the contextual information C is stored in the node $N_2$. It is duplicated in its successor, the node $N_3$. As we have previously seen, the admission module of the management device of the peer-to-peer network $N_{p2p}$ has ensured that the adjacent nodes $N_2$ and $N_3$ are not deployed on the same processing device.

In this way, the next requests belonging to the same session may be processed by recovering the textual information present on the node $N_2$, and in the event of a failure of this node, on the successor, node $N_3$.

Since the two nodes $N_2$ and $N_3$ are not on the same processing device, the probability of these failing simultaneously is very low.

The invention therefore resolves the technical problem, without fundamentally changing the known mechanisms of the peer-to-peer network management.

The invention claimed is:

1. A management device for a peer-to-peer network, comprising:
a plurality of nodes distributed among a plurality of processing devices and arranged in a circle so that each node has a unique successor node, said management device being configured to insert a new node within said peer-to-peer network, to determine a pair of adjacent nodes of the plurality of nodes deployed on a same processing device and to insert said new node between the two nodes of said pair.

2. The management device of claim 1, wherein said management device is an admission component implemented by a different device to said plurality of nodes.

3. The management device of claim 1, wherein said management device is an admission component implemented by at least one of said plurality of nodes.

4. A communication element, comprising;
at least one interface with a communication network containing communication elements; and
a peer-to-peer network for processing requests from said communication elements, said peer-to-peer network including a plurality of nodes distributed among a plurality of processing devices and arranged in a circle so that each node has a unique successor node, and associated with a management device configured to insert a new node within said peer-to-peer network, said plurality of nodes configured to store contextual information used to process said requests,
wherein said management device is configured to determine a pair of adjacent nodes of the plurality of nodes deployed on a same processing device and to insert said new node between the two nodes of said pair.

5. The communication element of claim 4, wherein said contextual information stored in one of said nodes is duplicated in a corresponding one of the unique successor nodes.

6. The communication element of claim 4, wherein said management device is an admission component implemented by a different device to said plurality of nodes.

7. The communication element of claim 4, wherein said management device is an admission component implemented by at least one of said plurality of nodes.

8. The communication element of claim 4, wherein said interface with said communication network is configured to send session initiated protocol (SIP) compliant signaling messages.

9. A communication network comprising the communication element of claim 4.

* * * * *

UNITED STATES PATENT AND TRADEMARK OFFICE
CERTIFICATE OF CORRECTION

PATENT NO. : 9,294,559 B2
APPLICATION NO. : 12/457413
DATED : March 22, 2016
INVENTOR(S) : Dimitri Tombroff and Pierre De Rop Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1555 days.

Signed and Sealed this
Second Day of August, 2016

Michelle K. Lee
*Director of the United States Patent and Trademark Office*